US009412053B1

(12) United States Patent
Patrick et al.

(10) Patent No.: US 9,412,053 B1
(45) Date of Patent: Aug. 9, 2016

(54) METHOD, APPARATUS AND SYSTEM FOR PROJECTING LIGHT FOR USER GUIDANCE

(71) Applicant: Google Inc., Mountain View, CA (US)

(72) Inventors: William Graham Patrick, San Francisco, CA (US); Eric Teller, Palo Alto, CA (US); Johnny Lee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 766 days.

(21) Appl. No.: 13/673,828

(22) Filed: Nov. 9, 2012

(51) Int. Cl.
*G06K 9/78* (2006.01)
*G06F 19/00* (2011.01)
*G01C 15/02* (2006.01)
*H05B 37/02* (2006.01)

(52) U.S. Cl.
CPC . *G06K 9/78* (2013.01); *H05B 37/02* (2013.01)

(58) Field of Classification Search
CPC ........... G06F 19/00; G01C 15/02; G06T 9/78; H05B 37/02; G09G 5/08
See application file for complete search history.

(56) References Cited

U.S. PATENT DOCUMENTS 6,600,476 B2 7/2003 Mathis et al.
7,515,981 B2 4/2009 Ryznar et al.
7,530,019 B2 5/2009 Kjeldsen et al.
8,027,745 B1 9/2011 Freeze
8,162,486 B2 4/2012 Borger et al.
8,199,108 B2 * 6/2012 Bell ........................ G06F 3/011 345/156
2005/0128437 A1 6/2005 Pingali et al.
2011/0179624 A1 7/2011 Sexton
2011/0243380 A1 10/2011 Forutanpour et al.
2011/0314001 A1 * 12/2011 Jacobs et al. .................. 707/722

FOREIGN PATENT DOCUMENTS

WO WO 2012/109593 A1 8/2012

OTHER PUBLICATIONS

Kjeldsen, et al., "Interacting with Steerable Projected Displays; In: Proc. of 5th International Conference on Automatic Face and Gesture Recognition (FG'02). Washington, DC. May 20-21, 2002", 6 pgs.

* cited by examiner

*Primary Examiner* — Sath V Perungavoor
*Assistant Examiner* — Patricia I Young
(74) *Attorney, Agent, or Firm* — Blakely Sokoloff Taylor & Zafman LLP

(57) ABSTRACT

Embodiments of an apparatus, system and method for creating light projection solutions for user guidance are described herein. A user may request that projected light be used to assist in a plurality of operations involving objects in the physical space around the user. A user can use voice commands and hand gestures to request that a projector project light or images on or near objects involved in one or more operations. Embodiments of the disclosure perform an image recognition process to scan the physical space around the user and to identify any user gesture performed (e.g., a user pointing at a plurality of objects, a user holding an object); a steerable projector may be actuated to project light or image data based on the user's request and a plurality of operations associated with the objects.

23 Claims, 8 Drawing Sheets

METHOD, APPARATUS AND SYSTEM FOR PROJECTING LIGHT FOR USER GUIDANCE

TECHNICAL FIELD

Embodiments of the disclosure relate to the field of lighting systems, and more particularly, to light projection solutions for providing user guidance.

BACKGROUND

Lighting systems exist to illuminate objects around a physical space of a user. In order to have a flexible and adaptable lighting arrangement, solutions utilize multiple light sources to be activated and controlled manually by a user. What is needed is a solution capable of creating dynamic light projection solutions to assist with a user's interactions with surrounding objects.

BRIEF DESCRIPTION OF THE DRAWINGS

The present disclosure will be understood more fully from the detailed description given below and from the accompanying drawings of various embodiments of the disclosure, which, however, should not be taken to limit the invention to the specific embodiments, but are for explanation and understanding only.

DETAILED DESCRIPTION

Embodiments of an apparatus, system and method for creating light projection solutions for user guidance are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
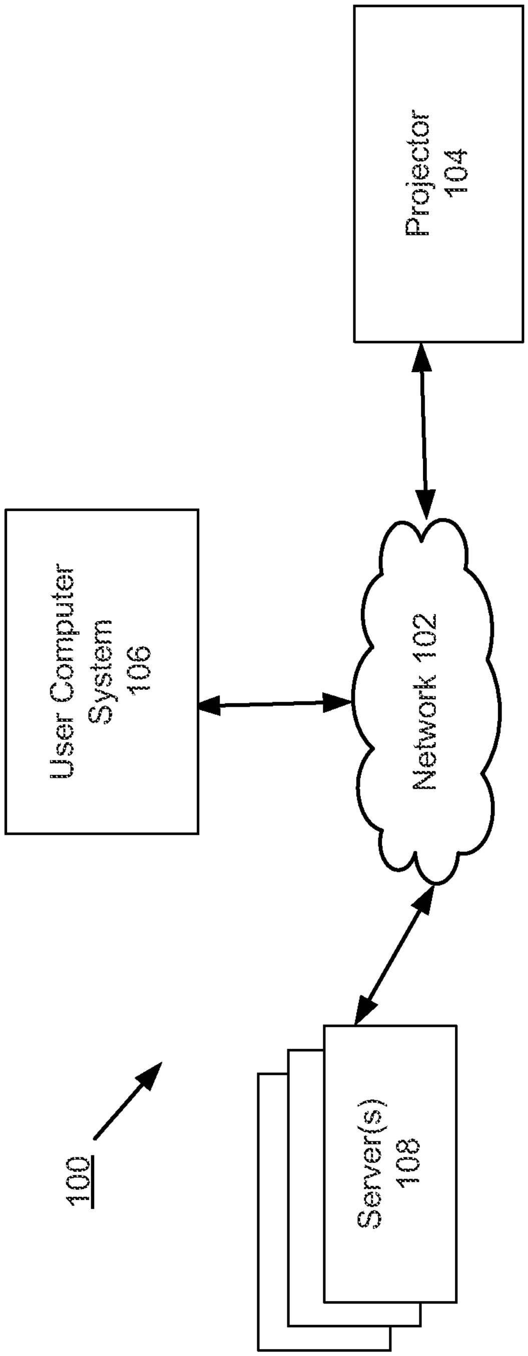
FIG. 1 is a block diagram of a system architecture for creating light projection solutions for user guidance according to an embodiment of the disclosure.

FIG. 1 is a block diagram of a system architecture for creating light projection solutions for user guidance according to an embodiment of the disclosure. As explained herein, light projection solutions for user guidance describe projecting light on or near objects in the physical space around the user for assisting the user in executing operations involving the objects. For example, a user may issue commands/queries such as "Show me how to assemble these objects" or "Where should I install this object?"; embodiments of the disclosure may project light or image data (and additionally in some embodiments, audio data) to identify the objects in relation to an operation—e.g., light/image data identifying objects to be assembled, a location for object installation, etc.

In this embodiment, system 100 includes projector 104, user computer system 106, and one or more servers 108 communicatively coupled via network 102. In one embodiment, projector 104, user computer system 106, and server(s) 108 may comprise computing devices, such as a desktop computer, laptop computer, personal digital assistant, tablet computer, a mobile telephone, a cellular communication enabled wearable device, etc. In one embodiment, projector 104 is a web-enabled self-contained computing device. Although a single projector and user computer system are illustrated in system 100, in the embodiments discussed herein, a plurality of projectors and/or a plurality of user computer systems may be deployed to support light projection solutions for user guidance as discussed below.

Projector 104, user computer system 106, and server(s) 108 may be communicatively coupled via network 102 that communicates any of the standard protocols for the exchange of information. In one embodiment, user computer system 106 and projector 104 may be coupled with network 102 via a wireless connection, such as a cellular telephone connection, wireless fidelity connection, etc. Projector 104, user computer system 106, and server(s) 108 may run on one Local Area Network (LAN) and may be incorporated into the same physical or logical system, or different physical or logical systems. Alternatively, projector 104, user computer system 106, and server(s) 108 may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

In one embodiment, projector 104 is mounted in an elevated position (e.g., mounted on a ceiling, wall, raised pedestal). The projector mount may be actuated to dynamically steer the projector in order to project light or image data on one or more surfaces, as described below. An optical sensor (e.g., a camera system) and/or an audio sensor (e.g., a microphone) are included in system 100 and are communicatively coupled to controller logic and/or modules executed by user computer system 106. The optical sensor may be mounted with projector 104 or separately mounted on an independently steerable mount. In some cases projection sources and multiple optical sensors are mounted in an elevated position to display images of objects from multiple perspectives. The controller can steer projected light or images onto various surfaces throughout the physical space surrounding the user. Using an auto focus and zoom lens, the light or images can be focused onto variable distanced surfaces and enlarged or shrunk at will. Using gesture controls and voice commands, one or more users can interact with the system anywhere within the room, as described below. Said gesture controls may be analyzed via image and audio recognition processes, executed by any combination of user computer system 106 and servers 108.

In some embodiments, a user may request light projection for user guidance (e.g., operational guidance for a plurality of objects near the user) with either an audible command or a physical gesture, such as hand gestures or eye movements. For example, a user can use a voice command to request projected light, and use a hand gesture to identify an object. In embodiments where projector 104 comprises a steerable projector, it may be actuated to project the light or image data onto or near an object. In embodiments utilizing multiple projectors, one of the projectors is selected to project light or image data at an appropriate location (e.g., a projector closest to the object's location is selected, etc.).

In some embodiments, a user can request that projected light be used to assist in a plurality of operations involving objects in the physical space around the user. A user can use voice commands and hand gestures to request that projector 104 project light or images on or near objects involved in an operation (e.g., "Where does this component go?" "Which two components do I need to combine?"). System 100 may utilize user computing device 106 and/or servers 108 to perform an image recognition process to scan the physical space around the user and to identity any user gesture performed (e.g., a user pointing at a plurality of objects, a user holding an object); a steerable projector may be actuated to project light or image data based on the user's request and a plurality of operations associated with the objects (or alternatively, one of a plurality of lights sources is selected to project the image data).

Figure 2:
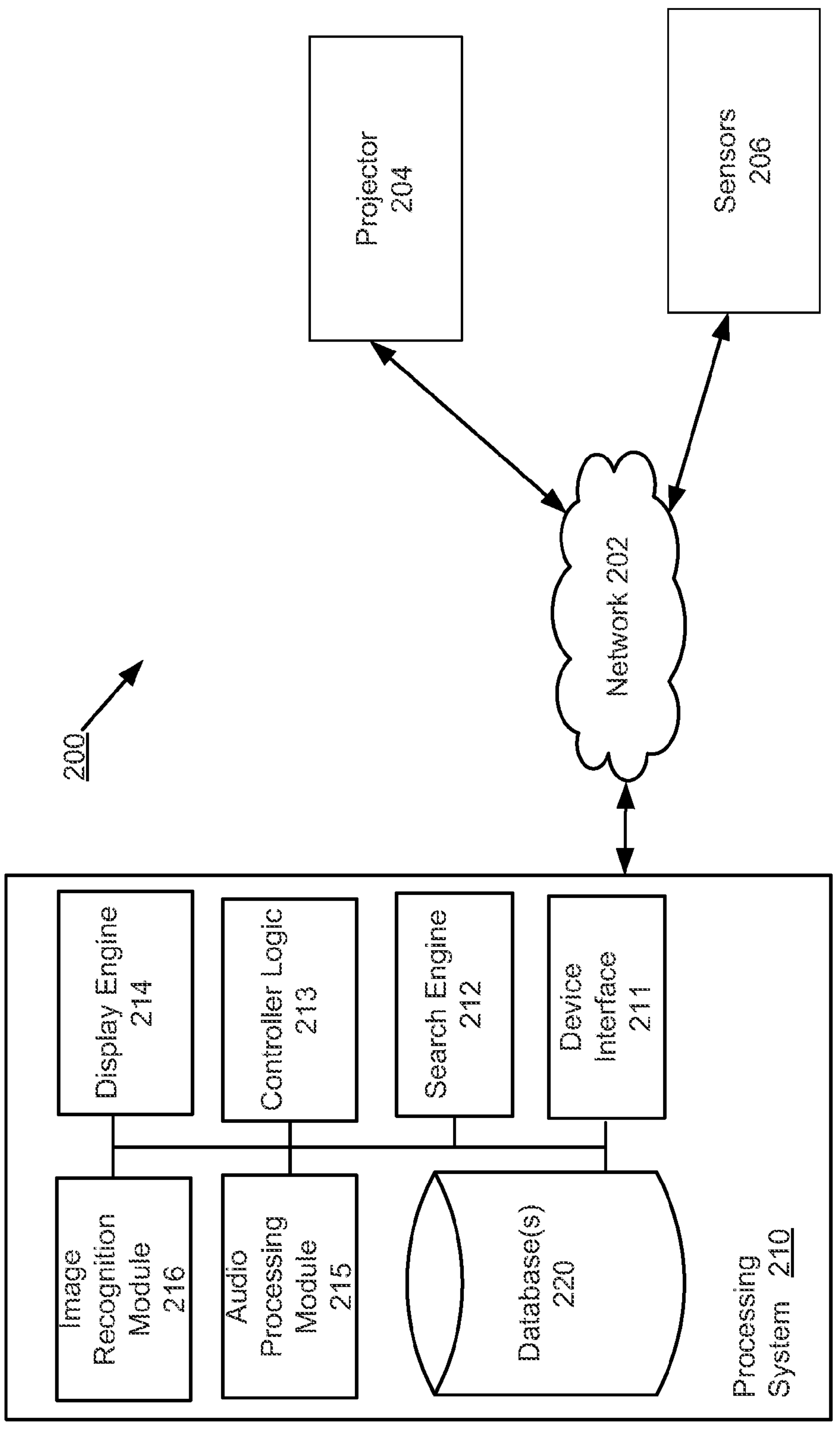
FIG. 2 is a block diagram of a system architecture for creating light projection solutions for user guidance according to an embodiment of the disclosure.

FIG. 2 is a block diagram of a system architecture for creating light projection solutions for user guidance according to an embodiment of the disclosure. System 200 illustrates multiple devices, including multiple logic and module blocks, for exemplary purposes. Any block labeled as logic or a module in this example may be implemented as processor-executable software, firmware, hardware or any combination in other embodiments. Furthermore, the functionality of system 200 in this example may be included in one or any plurality of devices in any combination.

System 200 includes projector 204, sensors 206, and processing system 210 communicatively coupled via network 202. Projector 204 may include one or more light sources configured to project light or image data onto or near one or more objects surrounding a user (e.g., micro-display projectors, scanning mirror projectors, etc.). Sensors 206 include an optical sensor to capture optical data of objects in the physical space around the user. In one embodiment, said optical sensor comprises an infrared (IR) sensor to capture low light optical data representing the objects. In one embodiment, said optical sensor comprises an image sensor to capture photographic or video data of the user and the objects in the physical space around him. Sensors 206 may also include an audio sensor to capture audio data that includes user voice requests for projecting light on the objects based on a plurality of operations involving the objects, as described below.

Processing system 210 includes device interface 211 to receive/send data from/to sensors 206 and projector 204. Data received from sensors 206 is used to interpret the user request for projected light and data sent to projector 204 is used to select and/or move the projector's light sources in order to project light or images on or near the objects in the physical space around the user.

Audio processing module 215 may process audio data to analyze user voice requests for projected light from system 200. Image recognition module 216 may process image data received from sensors 206 to interpret user gestures made and/or locate objects within the physical space surrounding the user. For example, image recognition module 216 may receive image data from sensors 206 of a plurality of objects near a user; an image recognition process may be performed on this image data to identify the objects, and any operations associated with those objects (e.g., instructions for assembling the objects, a device input sequence, etc.).

Search engine 212 may execute a search within database 220 (which may store object images or object information such as barcode information, and data associated with the objects as described below) or execute a web-based search for data related to the objects around the user—i.e., image data of the objects and data related to operations involving the objects. For example, a user may issue the command/query: "How do I put these parts together?" while performing a user gesture towards a plurality of parts for assembly; image recognition module 216 may process image data received from sensors 206 to identify said parts, and search engine 212 may search for associated assembly instructions previously stored in database 220 or may execute a web-based search for said assembly instructions.

The results of these searches may be used by display engine 214, which may create image data to be projected by projector 204. Controller logic 213 is used to control projector 204 so that the light or image data is appropriately displayed for the user. Controller logic 213 may send commands to select and/or move projector light sources of projector 204 in order to project light or image data for the user to view; the light or image data may identify objects for a user to utilize when performing an operation, such as parts for the user to assemble according to an assembly instruction. In some embodiments, audio data may be also broadcast to assist the user in locating the object, or to describe the operation to be executed.

Figure 3:
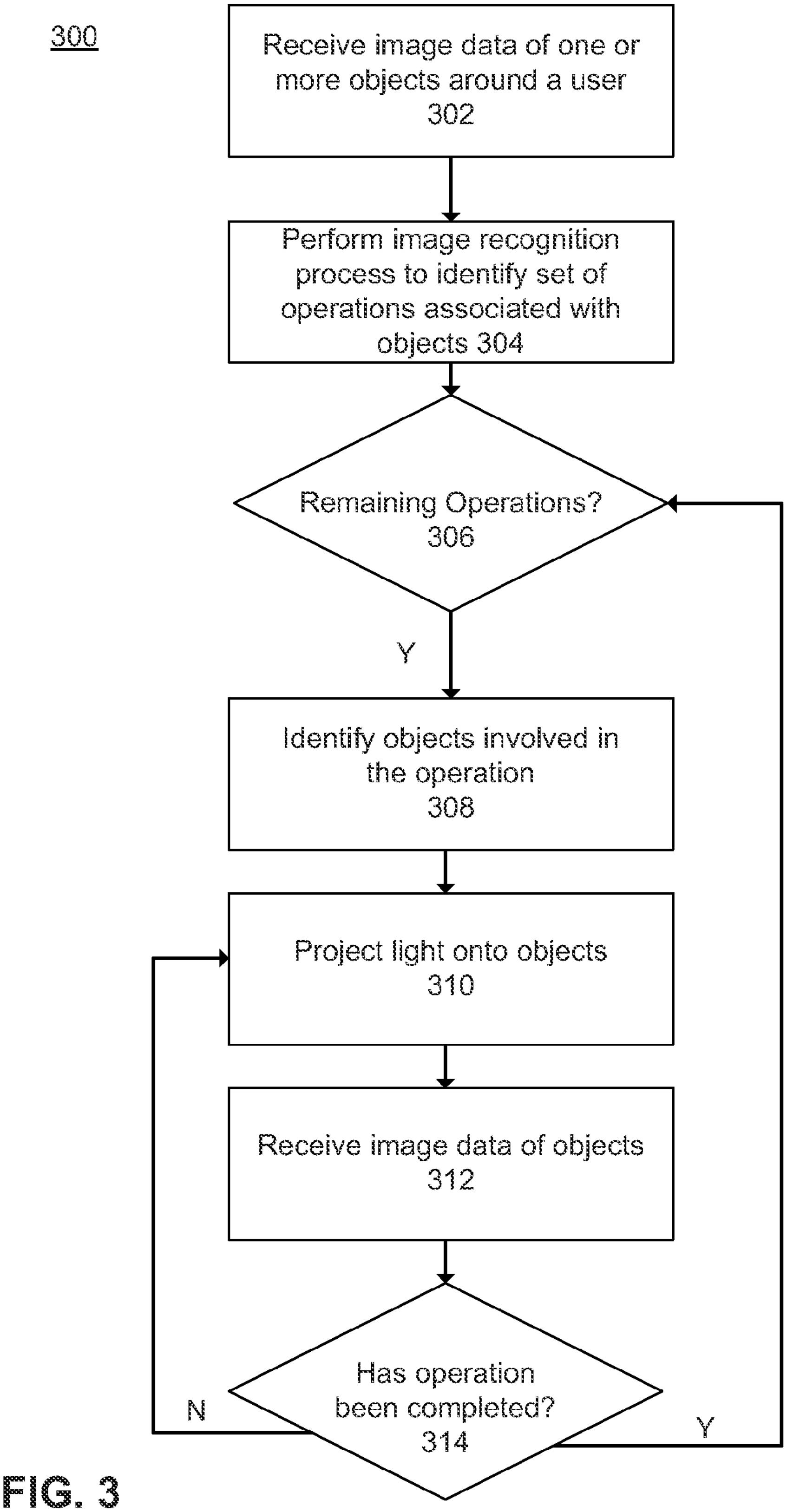
FIG. 3 is a flow diagram of a process for projecting light or image data for user guidance according to an embodiment of the disclosure.

FIG. 3 is a flow diagram of a process for projecting light or image data for user guidance according to an embodiment of the disclosure. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the disclosure; thus, not all actions are required in every implementation. Other process flows are possible.

Process 300 is performed by processing solutions that may comprise hardware (circuitry, dedicated logic, etc.), software (such as software run on a general purpose computer system or a dedicated machine), firmware, or a combination. Process 300 may be performed by any combination of client and server devices.

Image data of objects near a user is received from an image sensor, 302. In some embodiments, said image data is captured in response to a user request comprising audio data that includes a voice command—e.g., image data of objects around a user may be captured in response to the audible user command "Show me how to use these objects." The user request may also comprise an explicit user gesture pointing to one or more objects—e.g., image data of objects near a user may be captured in response to the audible user command "Show me how to use those objects" accompanied by a user gesture pointing to said objects. Thus, sensor data comprising either or both audio and video data may be received and analyzed to initiate the capture of said image data of the objects. The user request may also comprise implicit gestures rather than explicit gestures. For example, a user may hold up an electrical plug for a device, and embodiments of the disclosure may interpret this action as an implicit gesture to show the user the location of a corresponding electrical socket.

An image recognition process is performed to identify the objects, and to identify a set of operations associated with the objects, 304. For example, the plurality of objects may be parts for assembly and the set of operations may be assembly instructions; thus, an image recognition process may either identify the parts for assembly from the image data, or identify related identification data from the image data (e.g., a product serial number, barcode information, etc.). In response to identifying the parts for assembly, the related assembly instructions may be identified and retrieved (e.g., instructions stored in a database, received from a web-based search, etc.).

In another example, the objects may comprise a plurality of input mechanisms on various devices (e.g., audio/video (A/V) equipment, household appliances, computing devices, control panels such as thermostats, etc.), and the set of operations associated with the input devices may comprise a list of tasks to be executed by the user. Said list of tasks may be received initially, and the input mechanisms related to the tasks may then be identified and registered with the image data (e.g., a set of music notation data is received, such as piano sheet music; the related input mechanisms of a musical instrument are identified, such as the appropriate keys of a piano, and registered with the image data).

Thus, the above examples describe that embodiments of the disclosure may receive image data of objects, and then identify operations related to these objects, or may receive a list of operations, and then identify the appropriate objects near the user that are involved in these operations.

For each of the plurality of operations associated with the objects near the user, 306, embodiments of the disclosure identify the one or more objects involved in the respective operation, 308. Light or image data is then projected onto or near the objects, 310. In the above discussed example involving a plurality of parts for assembly, embodiments of the disclosure may project light or image data identifying the first parts to be assembled.

Furthermore, the aforementioned list of operations associated with the objects may comprise either a sequential set of operations or a non-sequential set of operations. In the above discussed example involving a plurality of input device mechanisms related to tasks, embodiments of the disclosure may, for example, project light or image data on device input mechanisms related to an initial task if the operations are sequential operations, or may project light on all input mechanisms related to all operations if the operations are non-sequential.

For example, a user may request projected light for guidance in executing a task where operations are to be executed in a specific sequence, such as mixing various chemicals around the user, or preparing/cooking a food item using various ingredients and kitchen appliances around the user; embodiments of the disclosure would identify the appropriate objects involved in the first operation of the sequence, and so on until the operations were completed in sequence. Alternatively, a user may request projected light for guidance in executing a task where operations do not necessarily need to be executed in a specific sequence, such as placing together pieces of a puzzle; embodiments of the disclosure may identify the appropriate objects involved in any operations using any appropriate criteria (e.g., selecting puzzle pieces closest to the user) until the task is completed.

Subsequent image data related of the plurality of objects around the user is received, 312, and it is determined if the respective operation has been completed, 314. For example, for objects comprising mixable objects (e.g., soluble chemicals) embodiments of the disclosure may verify from the subsequent image data that a composite mixture of the combined two or more objects has been formed according to the respective operation. If the operation has been completed, then similar processes for creating light projection solutions to guide the user in completing the remaining operations are executed. If the operation has not been completed, then light may remain projected onto the objects related to the operation until said operation is completed. In other embodiments, an error condition may be executed (e.g., light, image data or audio data indicating to the user that the operation has not been completed, or has been completed erroneously). In some embodiments, in response to the user performing an operation out-of-sequence or erroneously completing an operation, adaptive algorithm processing may be utilized to determine if the user may still execute the original task or a new modified task, using a different sequence of operations (e.g., preparing/cooking a food item may still be possible even if the user completes an out-of-order operation or mistakenly adds an additional ingredient).

Figure 4:
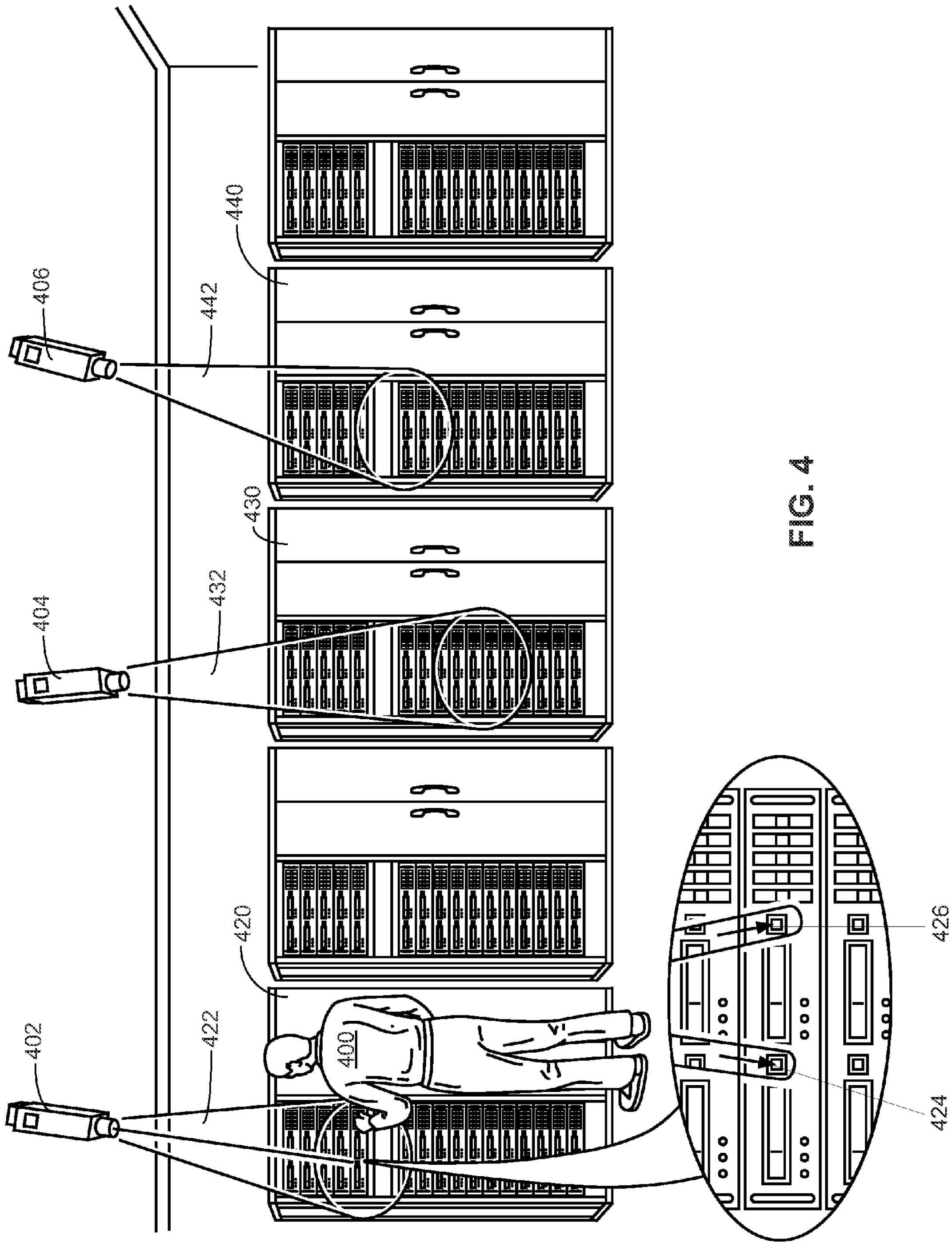
FIG. 4 is an illustration of a light projection solution providing task guidance for a user according to an embodiment of the disclosure.

FIG. 4 is an illustration of a light projection solution providing task guidance for a user according to an embodiment of the disclosure. In this example, user 400 is illustrated to be in a room with a plurality of devices, including computer server devices 420, 430 and 440. Servers typically include computational hardware, such as circuit boards, memory and computer processors, and are generally installed in racks or cabinets. User 400 may desire to perform a variety of tasks on the computer server devices, and projectors 402, 404 and 406 may be utilized to provide user guidance via projected light or images as illustrated.

In this example, the projectors project various beams of light to show the user the components of computer server devices 420, 430 and 440 related to various operations; as illustrated, projected light 422 from projector 402 is directed towards components of device 420, projected light 432 from projector 404 is directed towards device 430, and projected light 442 from projector 406 is projected towards device 440. These operations may be pre-stored instructions (e.g., instructions for executing a maintenance process) or dynamically determined operations (e.g., operations in response to error conditions). Furthermore, in this example the operations to be performed on said computer server devices comprise non-sequential operations; thus, user 400 may complete the tasks in any order, and the projected light may be eliminated to signal to the user that the respective task is completed. In other embodiments, light from projector sources 402, 406 and 408 may be projected sequentially based on the order that the tasks are to be completed (e.g., projected light 432 may be projected in response to the completion of operations on computer server device 420).

As illustrated in this example, in addition to projecting light onto various computer server device components, embodiments may project light or image data on various user input mechanisms for those components. Within projected light 422, light/image data 424 and 426 are projected onto input mechanisms related to the task for device 420. In this example, all light/image data is projected, indicating to the user that there is no order or sequence required to perform the task; as discussed above, for tasks comprising sequential instructions, embodiments may project light/image data according to the related sequence—e.g., light/image data 426 may be projected to guide the user in completing a second task in response to the completion of user interactions on the appropriate input mechanisms for a first task highlighted by light/image data 424. In some embodiments, audio data may be also broadcast via an audio output device to assist the user in locating the object (e.g., "The next task involves the server device to your right") or to describe the operation to be executed ("Remove the server components that are illuminated")).

Figure 5:
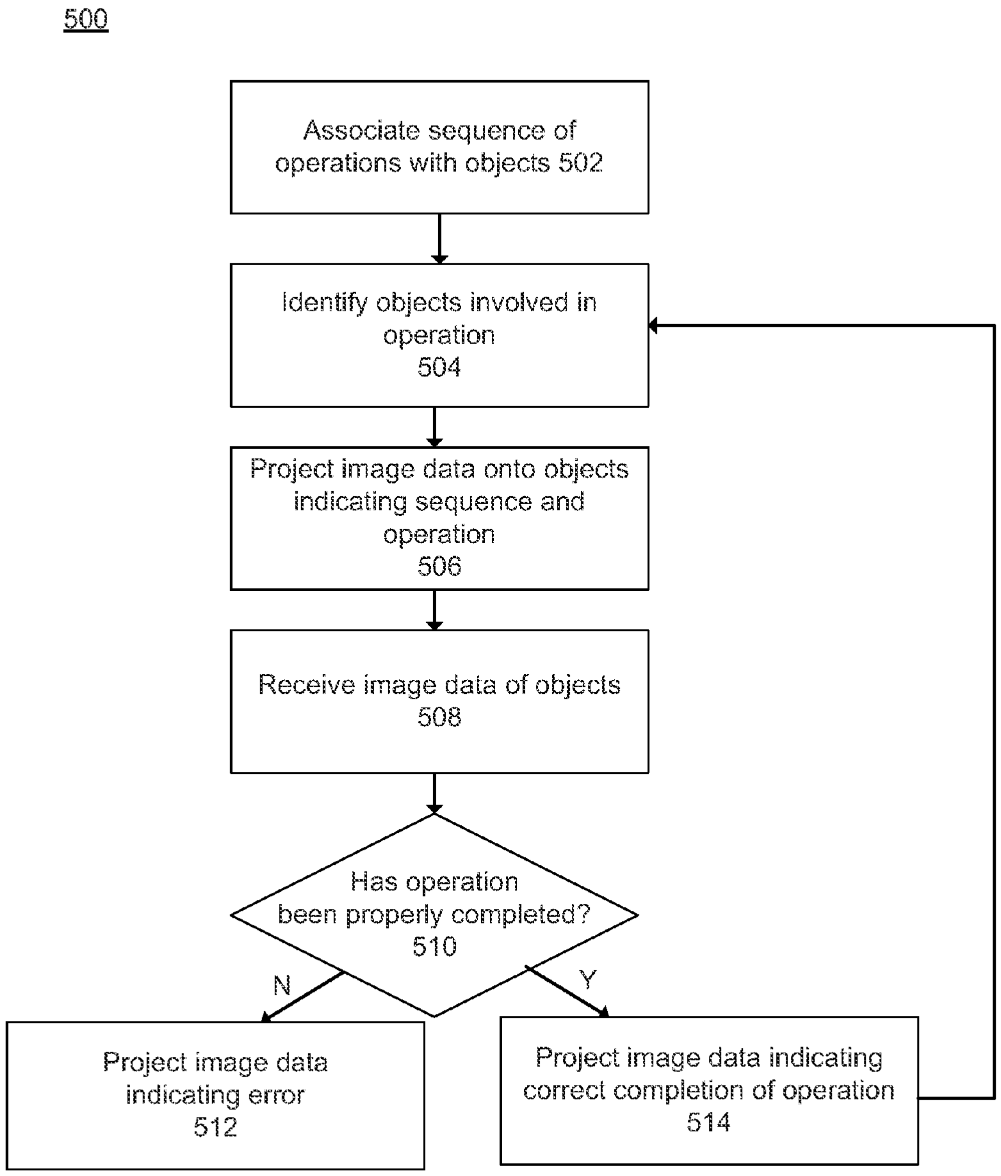
FIG. 5 is a flow diagram of a process for projecting light or image data related to a sequence of operations according to an embodiment of the disclosure.

FIG. 5 is a flow diagram of a process for projecting light or image data related to a sequence of operations according to an embodiment of the disclosure. Process 500 is performed by processing solutions that may comprise hardware (circuitry, dedicated logic, etc.), software (such as software run on a general purpose computer system or a dedicated machine), firmware, or a combination. Process 500 may be performed by any combination of client and server devices.

Image data of objects near a user is received from an image sensor, and an image recognition process is performed to associate the plurality of objects with one or more operations involving the plurality of objects, 502. For example, the plurality of objects may be parts for a Ready to Assemble (RTA) furniture item (e.g., table, chair, etc.) and the set of operations may be furniture assembly instructions; thus, an image recognition process may either identify the parts for assembly from the image data, or identify object identification from the image data (e.g., product serial number, barcode information, images on the product box, etc.). In response to identifying the parts for assembly, the related assembly instructions may be identified and retrieved (e.g., instructions stored in a database, received from a web-based search, etc.).

For each sequential operation, related objects are identified, 504, and image data is projected onto the objects involved in said operation, 506. For example, numerical image data indicating an order for the objects to be assembled may be projected on or near the objects.

Image data related of the plurality of objects around the user is received, 508, and it is determined if the respective operation has been completed, 510. If the operation has been completed, then image data is projected indicating to the user that the operation has been completed successfully, 514. In the example discussed above involving parts for assembling a furniture item, image data or light may be projected onto the partially assembled furniture item indicating to the user that operations have so far been completed according to the assembly instructions. If the operation has not been completed properly, then light or image data indicating an error condition may be projected on the objects or the user workspace, 512.

Figure 6A:
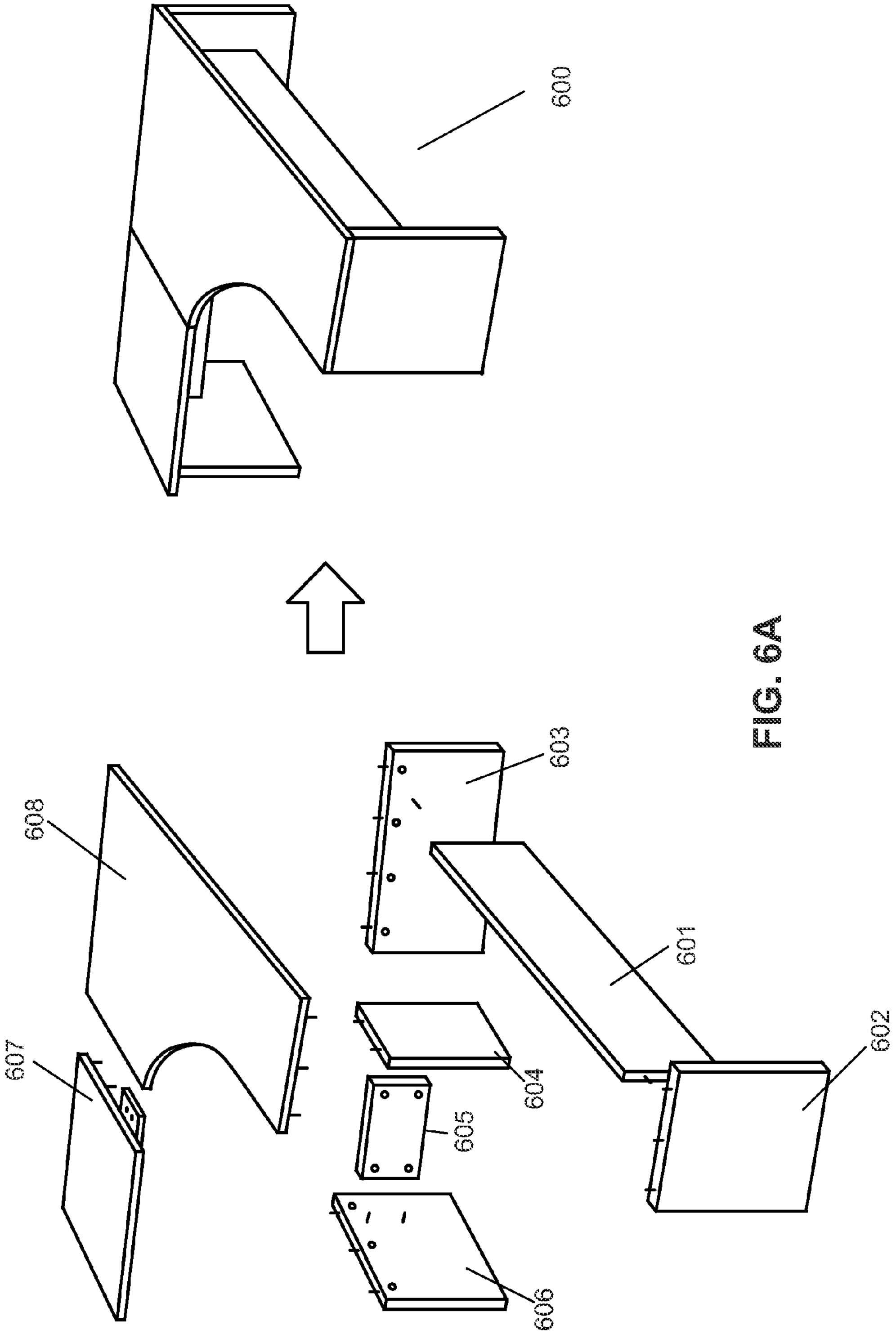
FIG. 6A and FIG. 6B are illustrations of a light projection solution to guide a user in performing a sequence of operations according to an embodiment of the disclosure.
Figure 6B:
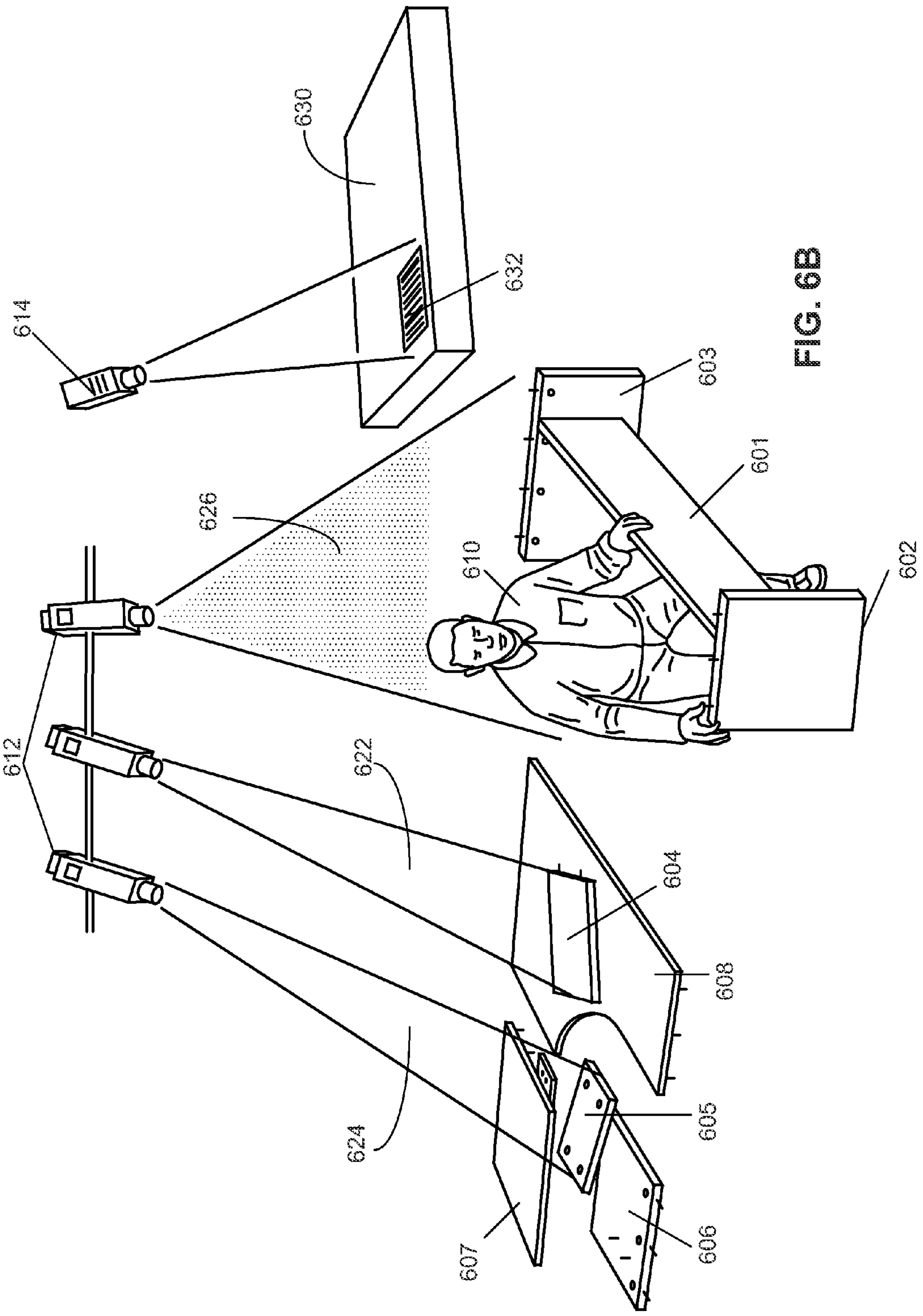

FIG. 6A and FIG. 6B are illustrations of a light projection solution to guide a user in performing a sequence of operations according to an embodiment of the disclosure. In this example a user is to assemble furniture item 600 comprising parts 601-608 as illustrated in FIG. 6A.

FIG. 6B illustrates user 610 as having partially constructed furniture item 600. Projector source 612 projects light 622 and 624 on parts 604 and 605, respectively, to indicate to user 610 that said parts are to be used in the subsequent assembly operation. In other embodiments, projector source 612 projects image data detailing the related assembly instruction—e.g., image data to show the user how to orient a part, and where to connect other parts to it. Projector source 612 also projects light 626 on the partially assembled furniture item (illustrated in this example to be assembled parts 601-603) to inform user 610 that operations have so far been completed according to the assembly instructions (e.g., by projecting a green-colored light). In the event that the user performs an assembly operation erroneously or performs an operation out-of-sequence, projection sources 612 may change light 626 to inform the user of an error condition (e.g., by projecting a red-colored light).

As described above, embodiments of the disclosure may perform image recognition processes on image data of the plurality of objects around a user to associate the objects with a related set of the instructions. In this example camera 614 is shown to capture image data of barcode information 632 from product box 630 in order to identify furniture item 600, and the related assembly instructions. These instructions may be retrieved via a web-based search, or may be retrieved from computing device storage.

Figure 7:
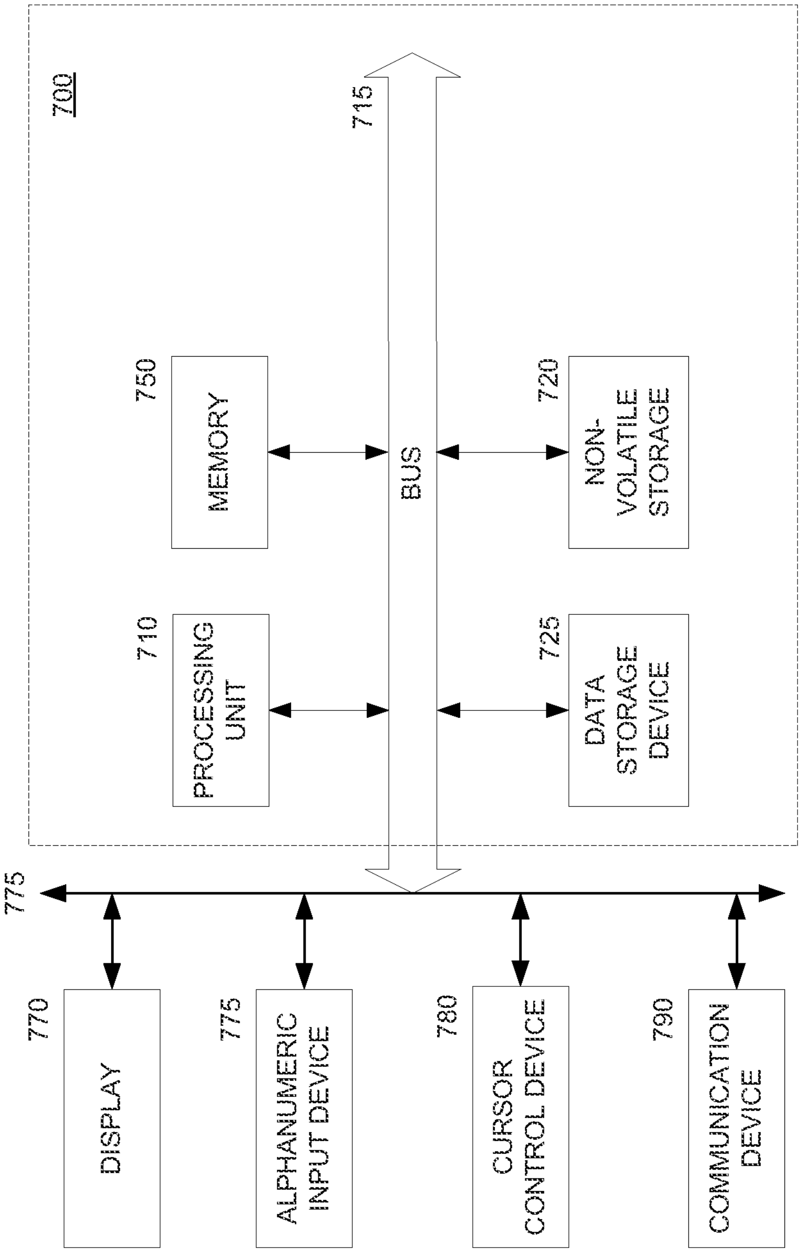
FIG. 7 is an illustration of a computing device to utilize an embodiment of the disclosure.

FIG. 7 is an illustration of a computing device to utilize an embodiment of the disclosure. Platform 700 as illustrated includes bus or other internal communication means 715 for communicating information, and processor 710 coupled to bus 715 for processing information. The platform further comprises random access memory (RAM) or other volatile storage device 750 (alternatively referred to herein as main memory), coupled to bus 715 for storing information and instructions to be executed by processor 710. Main memory 750 also may be used for storing temporary variables or other intermediate information during execution of instructions by processor 710. Platform 700 also comprises read only memory (ROM) and/or static storage device 720 coupled to bus 715 for storing static information and instructions for processor 710, and data storage device 725 such as a magnetic disk or optical disk and its corresponding disk drive. Data storage device 725 is coupled to bus 715 for storing information and instructions.

Platform 700 may further be coupled to display device 770, such as a cathode ray tube (CRT) or a liquid crystal display (LCD) coupled to bus 715 through bus 765 for displaying information to a computer user. Alphanumeric input device 775, including alphanumeric and other keys, may also be coupled to bus 715 through bus 765 for communicating information and command selections to processor 710. An additional user input device is cursor control device 780, such as a mouse, a trackball, stylus, or cursor direction keys coupled to bus 715 through bus 765 for communicating direction information and command selections to processor 710, and for controlling cursor movement on display device 770. In embodiments utilizing a touch-screen interface, it is understood that display 770, input device 775 and cursor control device 780 may all be integrated into a touch-screen unit.

Another device, which may optionally be coupled to platform 700, is a communication device 790 for accessing other nodes of a distributed system via a network. Communication device 790 may include any of a number of commercially available networking peripheral devices such as those used for coupling to an Ethernet, token ring, Internet, or wide area network. Communication device 790 may further be a null-modem connection, or any other mechanism that provides connectivity between computer system 700 and the outside world. Note that any or all of the components of this system illustrated in FIG. 7 and associated hardware may be used in various embodiments of the disclosure.

It will be appreciated by those of ordinary skill in the art that any configuration of the system illustrated in FIG. 7 may be used for various purposes according to the particular implementation. The control logic or software implementing embodiments of the disclosure can be stored in main memory 750, mass storage device 725, or other storage medium locally or remotely accessible to processor 710.

It will be apparent to those of ordinary skill in the art that any system, method, and process to capture media data as described herein can be implemented as software stored in main memory 750 or read only memory 720 and executed by processor 710. This control logic or software may also be resident on an article of manufacture comprising a computer readable medium having computer readable program code embodied therein and being readable the mass storage device 725 and for causing processor 710 to operate in accordance with the methods and teachings herein.

Embodiments of the disclosure may also be embodied in a handheld or portable device containing a subset of the computer hardware components described above. For example, the handheld device may be configured to contain only the bus 715, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the disclosure for such a device would be apparent to one of ordinary skill in the art given the disclosure as provided herein.

Embodiments of the disclosure may also be embodied in a special purpose appliance including a subset of the computer hardware components described above. For example, the appliance may include processor 710, data storage device 725, bus 715, and memory 750, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent series of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion above, it is appreciated that throughout the description, discussions utilizing terms such as "capturing," "transmitting," "receiving," "parsing," "forming," "monitoring," "initiating," "performing," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "capturing", "determining", "analyzing", "driving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The algorithms and displays presented above are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout the above specification are not necessarily all referring to the same embodiment. Furthermore, the particular features, structures, or characteristics may be combined in any suitable manner in one or more embodiments.

The present description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the various embodiments with various modifications as may be suited to the particular use contemplated.

The invention claimed is:

1. A method comprising:

analyzing a voice command acquired with an audio sensor to determine that a user is requesting projected light guidance associated with a plurality of objects;

analyzing a user gesture acquired with an image sensor to identify with which of the plurality of objects located near the user the request for projected light guidance is associated;

receiving first image data from the image sensor of the plurality of objects near the user in response to the user gesture and the voice command;

performing an image recognition process on the first image data to associate the plurality of objects with one or more operations involving the plurality of objects; and for each of the operation(s):

identifying one or more of the plurality of objects involved in the operation;

actuating a projector towards the object(s) involved in the operation;

projecting light on or near the object(s) involved in the operation;

receiving second image data from the image sensor of the plurality of objects near the user; and determining from the second image data that the respective operation has been completed.

2. The method of claim 1, wherein the light projected on or near the object(s) involved in the operation comprises one or more projected image graphics to identify the object(s) involved in the operation to the user.

3. The method of claim 2, wherein the operation(s) comprises a sequence of operations, and the method further comprises:

in response to determining an out-of-sequence operation involving one or more of the plurality of objects has been completed, projecting one or more image graphics indicating that an out-of-sequence operation has been completed.

4. The method of claim 1, wherein the plurality of objects comprises a plurality of user input mechanisms for one or more electronic appliances.

5. The method of claim 1, wherein the plurality of objects comprises a plurality of parts for assembly.

6. The method of claim 5, wherein determining from the second image data that the respective operation has been completed comprises:

determining from the second image data that the parts have been assembled according to the respective operation.

7. The method of claim 6, further comprising:

in response to determining from the second image data that the parts have not been assembled according to the respective operation, projecting one or more image graphics on or near the parts indicating that the respective operation has not been completed.

8. The method of claim 5, wherein the plurality of parts for assembly comprises parts of a Ready to Assemble (RTA) article of furniture.

9. The method of claim 1, wherein the plurality of objects comprises a plurality of mixable objects, and the method further comprises:

for each operation involving the user to combine two or more objects, determining from the second image data that a composite mixture of the two or more objects has been formed according to the respective operation.

10. The method of claim 9, wherein the plurality of mixable items comprises a plurality of ingredients for a food item, and the operation(s) comprises instructions for preparing the food item.

11. The method of claim 1, wherein a user gesture identifying a first object from the plurality of objects is included in the first image data, and projecting light on or near the object(s) involved in the operation comprises projecting light on or near a second object involved in the operation.

12. The method of claim 1, further comprising:

executing a web-based search to retrieve the operation(s) involving the plurality of objects.

13. The method of claim 1, further comprising:

for each operation(s), outputting audio data identifying the object(s) involved in the operation or audio data describing the operation.

14. A non-transitory computer readable storage medium including instructions that, when executed by a processor, cause the processor to perform a method comprising:

analyzing a voice command acquired with an audio sensor to determine that a user is requesting projected light guidance associated with a plurality of objects;

analyzing a user gesture acquired with an image sensor to identify with which of the plurality of objects located near the user the request for projected light guidance is associated;

receiving first image data from the image sensor of the plurality of objects near the user in response to the user gesture and the voice command;

performing an image recognition process on the first image data to associate the plurality of objects with one or more operations involving the plurality of objects; and for each of the operation(s):

identifying one or more of the plurality of objects involved in the operation;

generating control data for projecting light on or near the object(s) involved in the operation;

receiving second image data from the image sensor of the plurality of objects near the user; and determining from the second image data that the respective operation has been completed.

15. The non-transitory computer readable storage medium of claim 14, wherein the light projected on or near the object(s) involved in the operation comprises one or more projected image graphics to identify the object(s) involved in the operation to the user.

16. The non-transitory computer readable storage medium of claim 14, wherein the plurality of objects comprises a plurality of user input mechanisms on one or more devices.

17. The non-transitory computer readable storage medium of claim 14, wherein the plurality of objects comprises a plurality of parts for assembly.

18. The non-transitory computer readable storage medium of claim 17, wherein determining from the second image data that the respective operation has been completed comprises:

determining from the second image data that the parts have been assembled according to the respective operation.

19. The non-transitory computer readable storage medium of claim 18, the method performed by the processor further comprising:

in response to determining from the second image data that the parts have not been assembled according to the respective operation, projecting one or more image graphics on or near the parts indicating that the respective operation has not been completed.

20. A system comprising:

an image sensor to capture image data;

an audio sensor to capture a voice command;

an projector to project light on or near the objects; and a projector control module to:

analyze the voice command acquired with the audio sensor to determine that a user is requesting projected light guidance associated with a plurality of objects;

analyze a user gesture acquired from the image sensor to identify with which of a plurality of objects near the user the request for projected light guidance is associated;

receive first image data from the image sensor of the plurality of objects near a user;

perform an image recognition process on the first image data to associate the plurality of objects with one or more operations involving the plurality of objects; and for each of the operation(s):

identify one or more of the plurality of objects involved in the operation;

generate control data for projecting light on or near the object(s) involved in the operation;

receive second image data from the image sensor of the plurality of objects near the user; and determine from the second image data that the respective operation has been completed.

21. The system of claim 20, wherein the operation(s) comprises a sequence of operations, and the projector control module to further:

in response to determining an out-of-sequence operation involving one or more of the plurality of objects has been completed, project one or more image graphics indicating that an out-of-sequence operation has been completed.

22. The system of claim 20, wherein the plurality of objects comprises a plurality of mixable objects, and the projector control module to further:

for each operation involving the user to combine two or more objects, determine from the second image data that a composite mixture of the combined two or more objects has been formed according to the respective operation.

23. The system of claim 20, wherein a user gesture identifying a first object from the plurality of objects is included in the first image data, and projecting light on or near the object(s) involved in the operation comprises projecting light on or near a second object involved.

* * * * *